Aug. 23, 1955  R. E. ROBERTS  2,715,914

FLEXIBLE TUBE

Original Filed March 18, 1946

INVENTOR.
ROBERT ELDON ROBERTS
BY
Bates, Peare & McBean
ATTORNEYS

United States Patent Office 2,715,914
Patented Aug. 23, 1955

2,715,914

FLEXIBLE TUBE

Robert E. Roberts, Ridgefield, Conn.

Original application March 18, 1946, Serial No. 655,268, now Patent No. 2,560,369. Divided and this application June 30, 1951, Serial No. 234,599

2 Claims. (Cl. 138—56)

This application is a division of my application Serial No. 655,268 filed March 18, 1946, now Patent No. 2,560,369 which, in turn, is a continuation in part of my application Serial No. 581,842 filed March 9, 1945, now Patent No. 2,584,501.

This invention relates to a flexible impervious tube for various uses, where it is important that the tube be readily flexed without danger of it being collapsed to shut off its passage. My tube is flexible and resilient and may be stretched or compressed axially or bent in any direction. It is well adapted for use with gas masks, oxygen helmets, anaesthetizing apparatus, for instance, or with various equipment where a flexible non-collapsible conduit is desired.

An object of the invention is to provide such a tube which while being comparatively light in weight and very flexible shall be thoroughly impervious on both the interior and exterior. Another object of the invention is to provide a tube which may be manufactured very inexpensively.

My tube provides a stretched helical spring, each coil of which is individually encased in rubber, such encased spring member being mounted within the crests of outer corrugations of a continuous tube and serving to reinforce the same while allowing the tube to expand or contract or flex in any direction, as desired.

My tube includes the helical spring, stretched from its normal condition of rest but to an extent less than its elastic limit; an individual casing around each coil of the spring, and an impervious tube to which the casings adhere and which is corrugated helically inwardly between the regions of the encased spring. This makes a very simple and relatively inexpensive construction and at the same time the spring is effectively attached to the continuous corrugated tube and is individually protected by its casing.

My improved tube, as well as certain steps in the manufacture thereof, are illustrated in the accompanying drawings and such steps are hereinafter fully explained.

Figure 1:
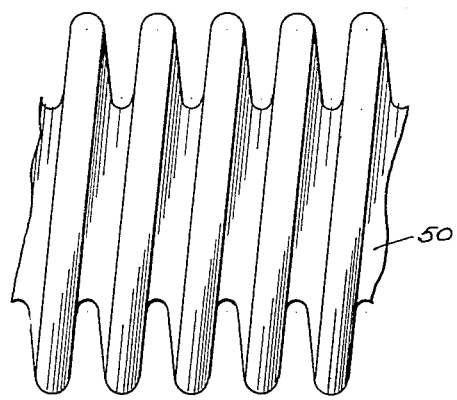
Figure 2:
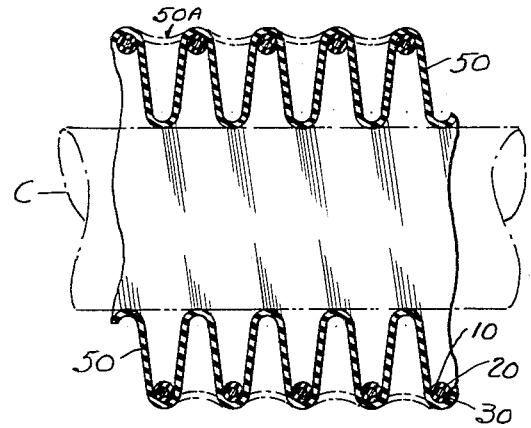
Figure 3:
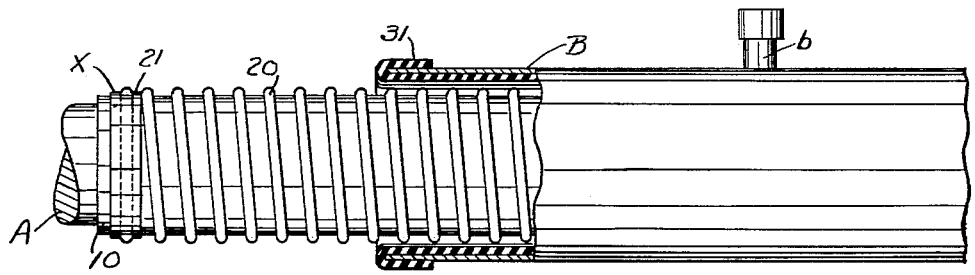
Figure 5:
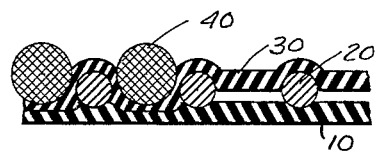
Figure 6:
Figure 4:
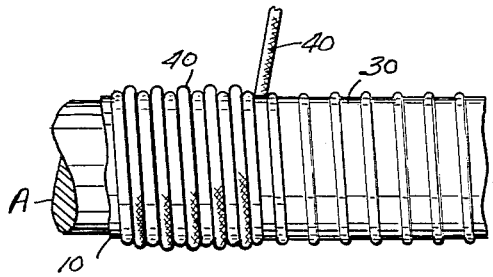

In the drawings: Fig. 1 is a side elevation of a portion of the finished tube; Fig. 2 is an axial section through the tube; Fig. 3 is an elevation partly broken away of means used in making the individual casing around the different coils of the stretched spring; Fig. 4 is an elevation showing a later step in forming such spring encasement; Fig. 5 is a fragmentary longitudinal section through the structure of Fig. 4; Fig. 6 is a cross section of any of the coils of the spring encased in rubber effected by the helical severance of the the construction of Figs. 5 and 6.

To give a better understanding of the tube, I will first refer to the method of encasing the spring coils, as indicated in Figs. 3 to 6. I utilize first a preliminary tube 10, Figs. 3 and 4, of rubber or similar material, this tube having a comparatively thin wall and open ends. I mount this tube on a suitable solid mandrel A by any suitable means. I then place over the tube a helical spring stretched axially of the mandrel, as shown at 20 in Fig. 3, and I secure the ends thereof to the underlying tube by wrapping the endmost coils of the stretched spring with adhesive tape, indicated at 21.

The next step is to place over the stretched spring a second cylindrical tube 30 of rubber or similar material. In placing this outer tube I prefer to employ a hollow mandrel B having an outward passageway through its wall communicating with a nipple b suitable for the attachment of an exhausting hose. I place within this hollow mandrel a rubber tube 30 with the ends extending beyond the mandrel and I cuff the ends of this tube outwardly and backwardly over the ends of the mandrel, as indicated at 31, in Fig. 3. I then exhaust the air between the interior surface of the mandrel and the body of the tube 30, thus holding it snugly as a lining on the mandrel. This lining is larger than the exterior of the stretched spring and this enables me to pass the hollow mandrel with its enclosed tube readily over the spring. Thereafter I release the vacuum and uncuff the ends of the tube and the latter by its own elasticity springs down onto the exterior of the spring so that I then have a stretched helical spring between an inner and outer tube.

I now wind a cord 40 (Fig. 4) about the outer tube in the spaces between the coils of the spring. Spring coils are close enough together so that the cord forces the outer tube 30 not only snugly against the inner tube 10 but in close engagement with the wire spring so that the wire spring has each coil entirely surrounded by rubber made up of the inner tube and the outer tube. This condition is illustrated in Fig. 5, where two turns of the cord 40 are shown and at the right thereof two portions of the inner and outer tubes and spring coils ready to receive two additional turns of the cord.

Following the corrugation of the outer tube and the enclosing of the spring by the application of the cord, the construction produced may, if desired, be given a preliminary vulcanization, or such vulcanization may wait until the completion of the operation, as about to be described.

Following the corrugating of the outward sleeve of the preliminary tube, I remove the cord 40 and cut through the two tubes 30 and 10 helically in the regions between adjacent turns of the wire spring and at a distance from the wire substantially corresponding to the thickness of rubber tubes. This helical severance results in the spring having its coils individually encased in sleeves of rubber, as shown in Fig. 6.

The rubber encased spring is now placed about a mandrel materially smaller than the interior of the spring (as indicated by the broken lines C in Fig. 2) with the spring stretched considerably beyond its position when it was encased but still less than to its elastic limit. I now put an outer tubular member comprising a sleeve 50 made of rubber or rubber-like vulcanizable material over the encased spring in the mandrel, in condition be-ing indicated by broken lines 50–a in Fig. 2.

The mounting of this tube 50 may be effected in any convenient manner but I prefer to employ a hollow mandrel having a vacuum connection similar to that shown in Fig. 1, but larger, and cuff the ends of the tube 50 over the ends of such mandrel and apply the vacuum and place such mandrel with its lining over the encased spring surrounding the solid mandrel and then by releasing the vacuum and uncuffing the ends of the outer spring I cause the tube 50 to lie in a festooned course over the spring.

The next step is to wind a suitable cord helically about the spaces between the spring coil to bring down the suspended portion 50a of the tube 50 tight against the mandrel. This effectively corrugates the tube into the condition shown in solid lines in Fig. 2, and I then vulcanize the product (completing the vulcanization of the encased spring if it has had a preliminary vulcanization) thereby producing a complete corrugating tube after the cord has been removed and the tube removed from the last used mandrel.

It will be seen that the tube having the characteristics explained is very simple in construction, consisting merely of an encased helical spring and an outer corrugated tube to which the casing adheres and to which it is vulcanized. Such tube may be cheaply constructed by the method described. When completed, the spring is entirely protected and gives the tube the characteristic desired of ready extensibility or compressibility as well as flexibility in any direction. Accordingly, the tube is suitable for various purposes without danger of contaminating the contents of the tube or injuring the spring.

I claim:

1. In a spirally corrugated reinforced tube having an impervious tubular wall comprising a thin single layer of vulcanizable rubber-like material, a tube reinforcing member comprising a helically coiled metallic wire spring, each of the coils of said spring being individually encased throughout its extent with a protective coating of vulcanizable rubber-like material of a substantially uniform thickness, said member extending lengthwise of the tube and having its coating in contact with and vulcanized to the wall of the tube, with its coils spaced one from the other axially of the tube whereby said coating retains the spring in position on the tube wall and protects the spring from corrosion and increases the wall thickness at the region of contact between the reinforcing member and tube wall without increasing the thickness of the tube wall intermediate the coils of the reinforcement.

2. A flexible tube having a preformed rubber tube comprising a single layer of rubber-like material, and a reinforcing member comprising a preformed helically coiled wire spring, said spring having a thin preformed encircling coating of a semi-cured rubber-like material substantially uniform in thickness, said spring being spaced axially of the rubber tube with its coating in contact with and vulcanized to the walls thereof, and wherein the wall of the rubber tube is spirally corrugated, such corrugations extending parallel with the coils of the spring and disposed therebetween.

References Cited in the file of this patent

UNITED STATES PATENTS

| | | |
|---|---|---|
| 713,560 | Dodge | Nov. 11, 1902 |
| 1,281,557 | Goodall | Oct. 15, 1918 |
| 1,746,701 | Kimmich | Feb. 11, 1930 |
| 2,269,877 | Johnson | Jan. 13, 1942 |
| 2,321,064 | Broedling | June 8, 1943 |
| 2,330,651 | Welger | Sept. 28, 1943 |
| 2,396,059 | Roberts | Mar. 5, 1946 |
| 2,430,081 | Roberts et al. | Nov. 4, 1947 |
| 2,475,389 | Hersey | July 5, 1949 |